A. C. FISCHER.
POWER CONTAINED DRIVE WHEEL.
APPLICATION FILED FEB. 23, 1917.
1,370,298.
Patented Mar. 1, 1921.
5 SHEETS—SHEET 1.
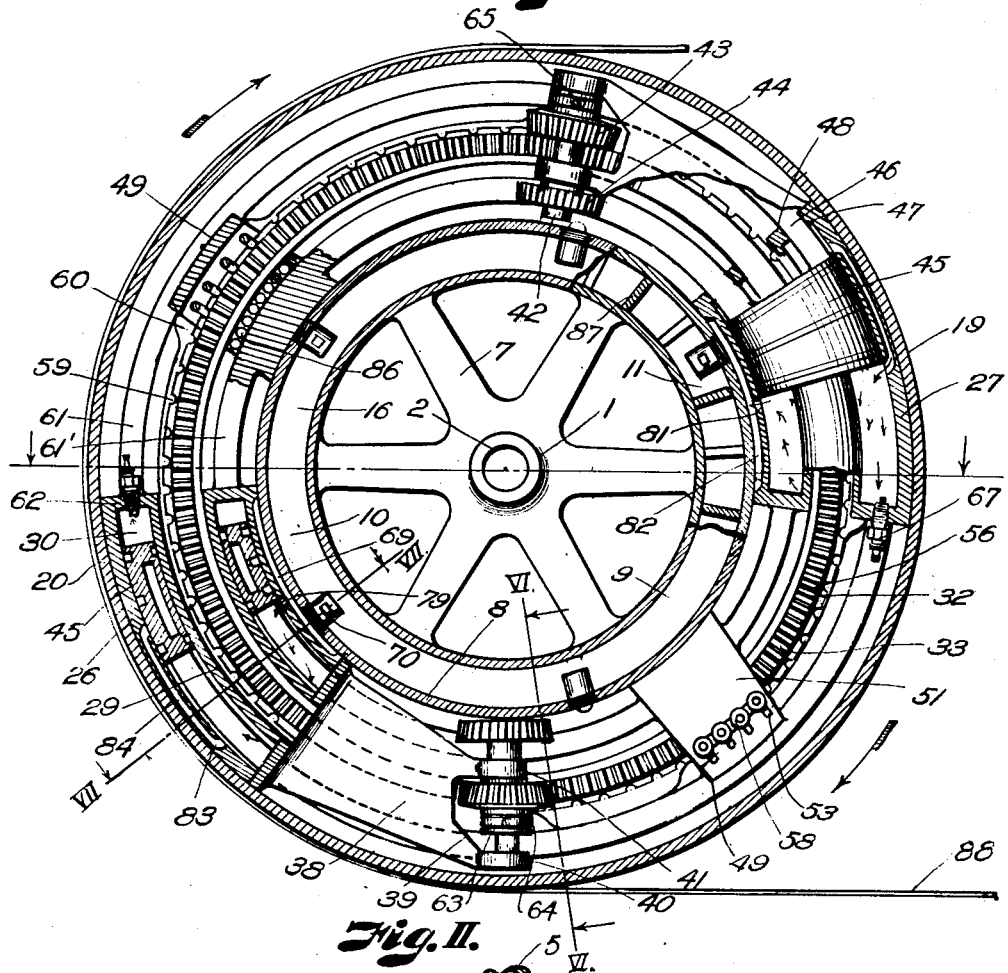
Fig. I.
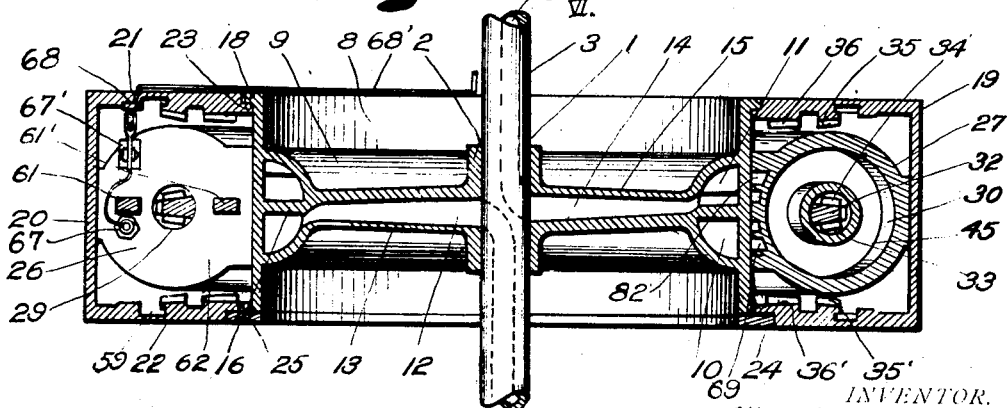
Fig. II.
INVENTOR.
Albert C. Fischer.
BY
Arthur C. Brown
ATTORNEY A. C. FISCHER.
POWER CONTAINED DRIVE WHEEL.
APPLICATION FILED FEB. 23, 1917.
1,370,298.
Patented Mar. 1, 1921.
5 SHEETS—SHEET 2.
Fig. III.
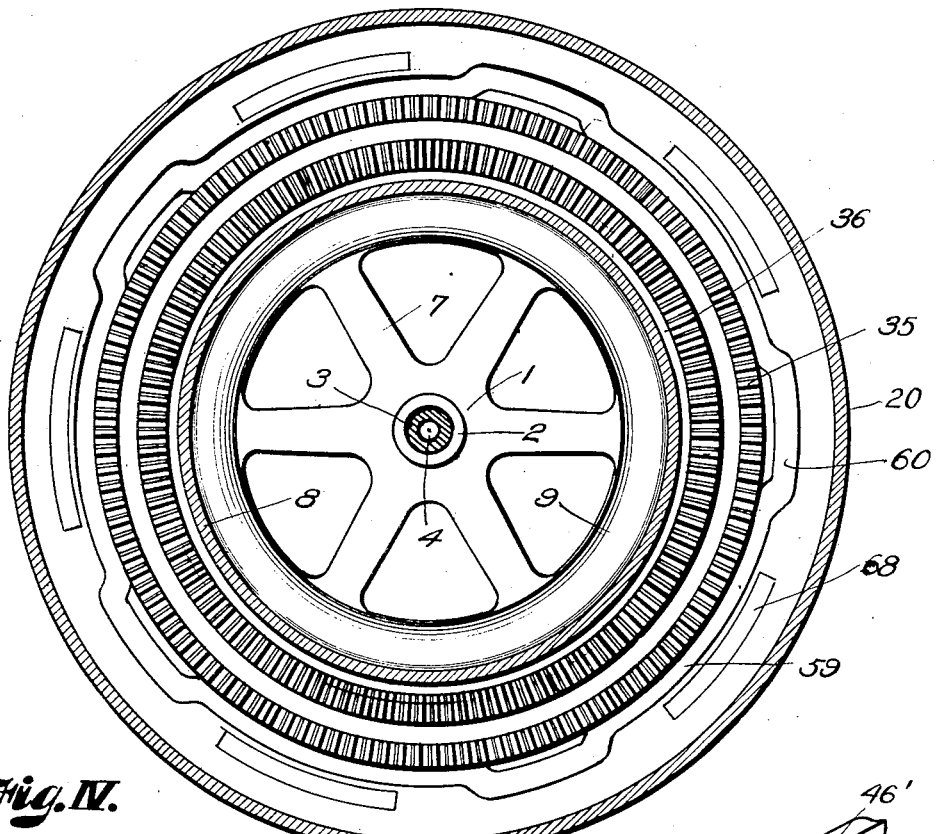
Fig. IV.
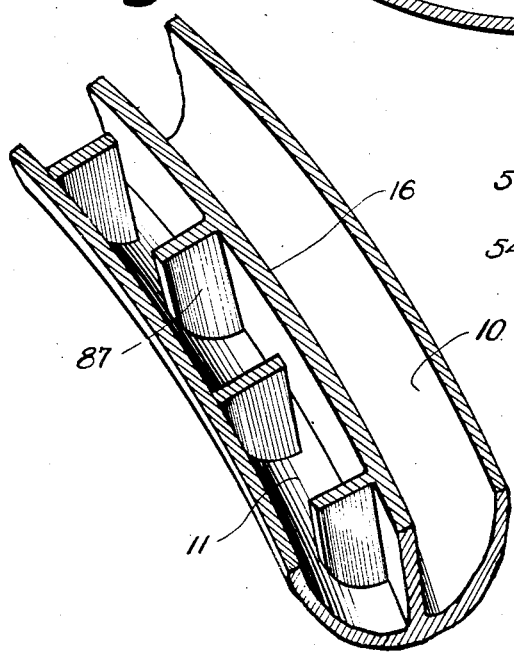
Fig. V.
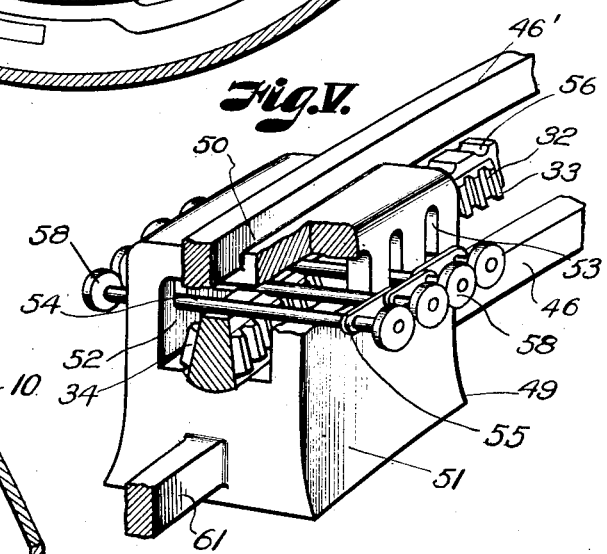
INVENTOR.
Albert C. Fischer.
BY
Arthur C. Brown
ATTORNEY

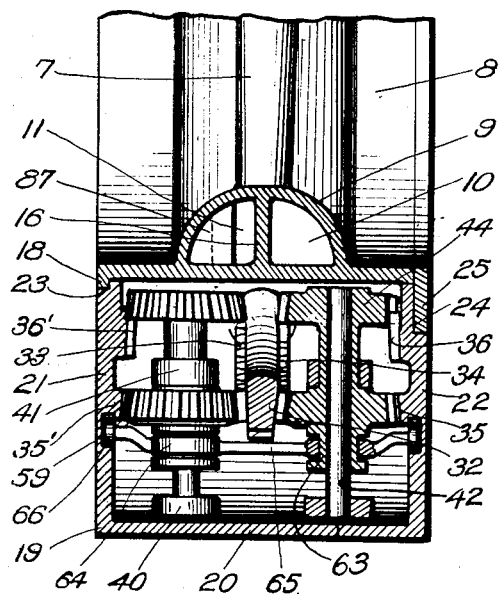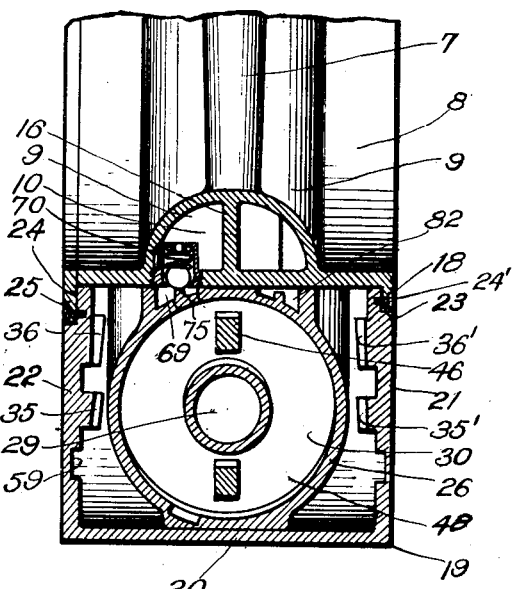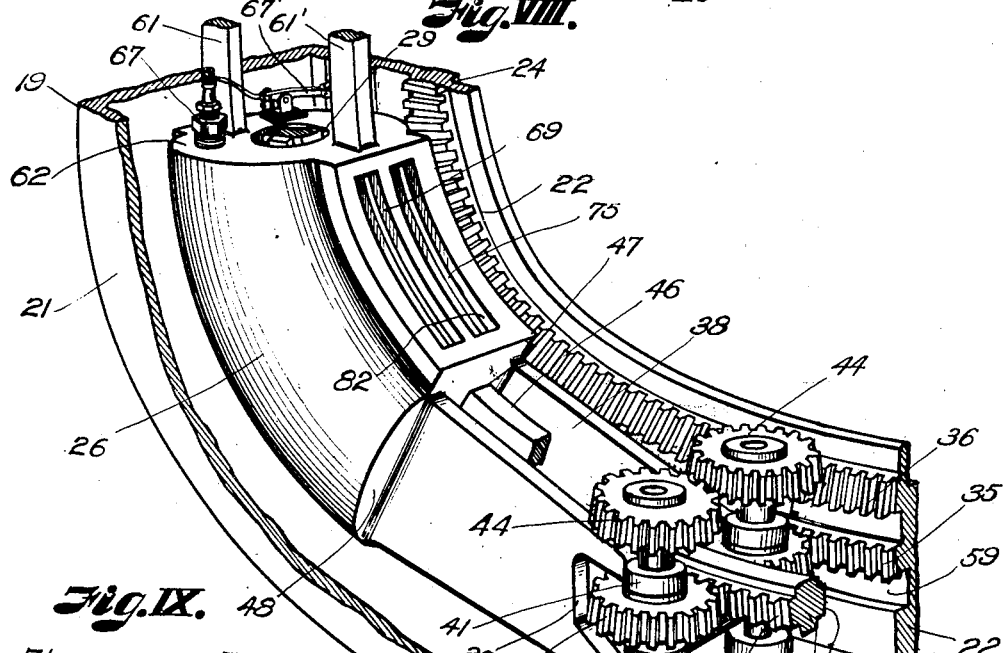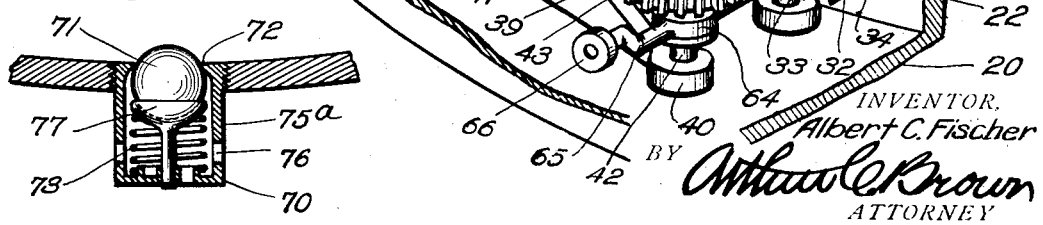

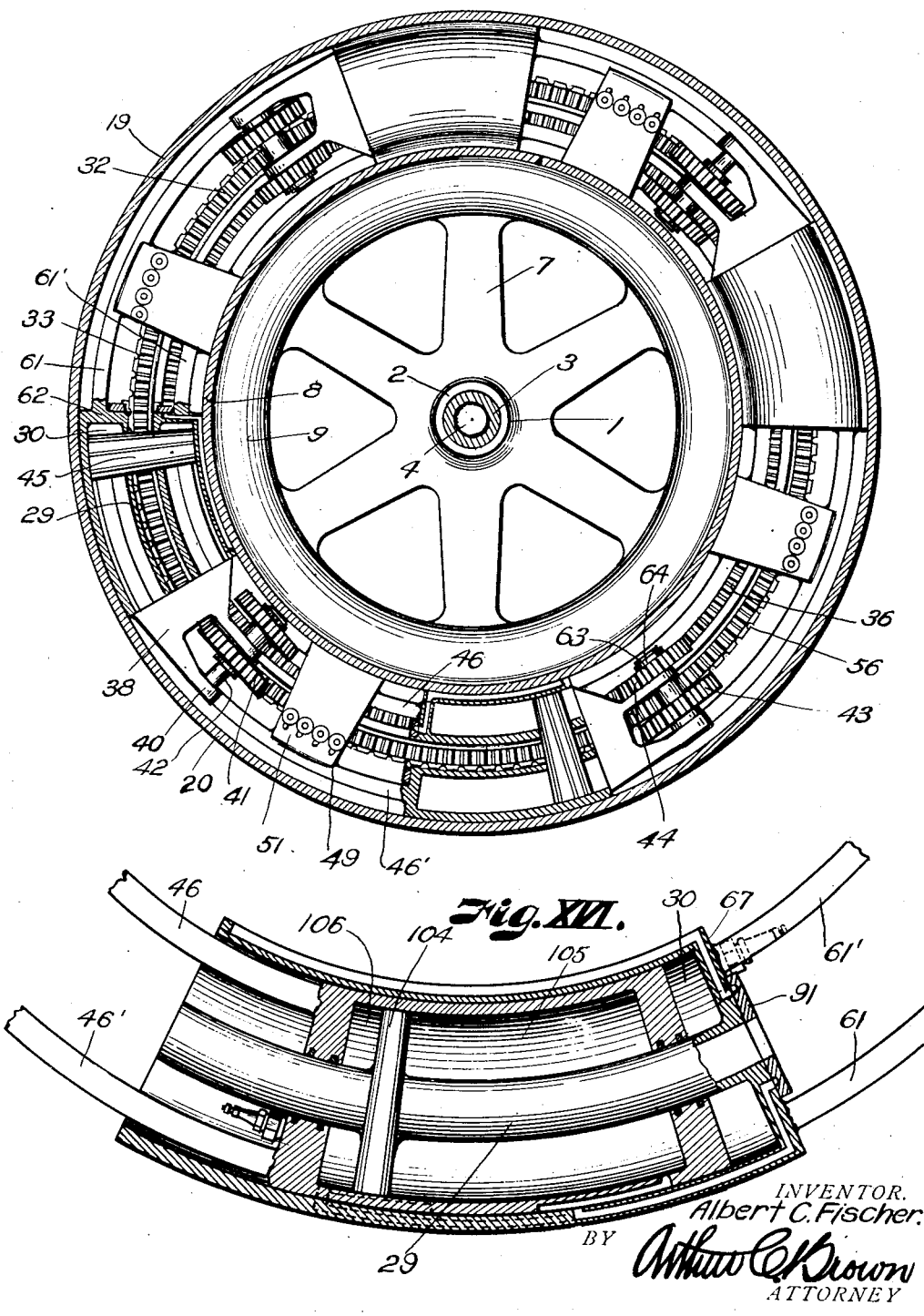

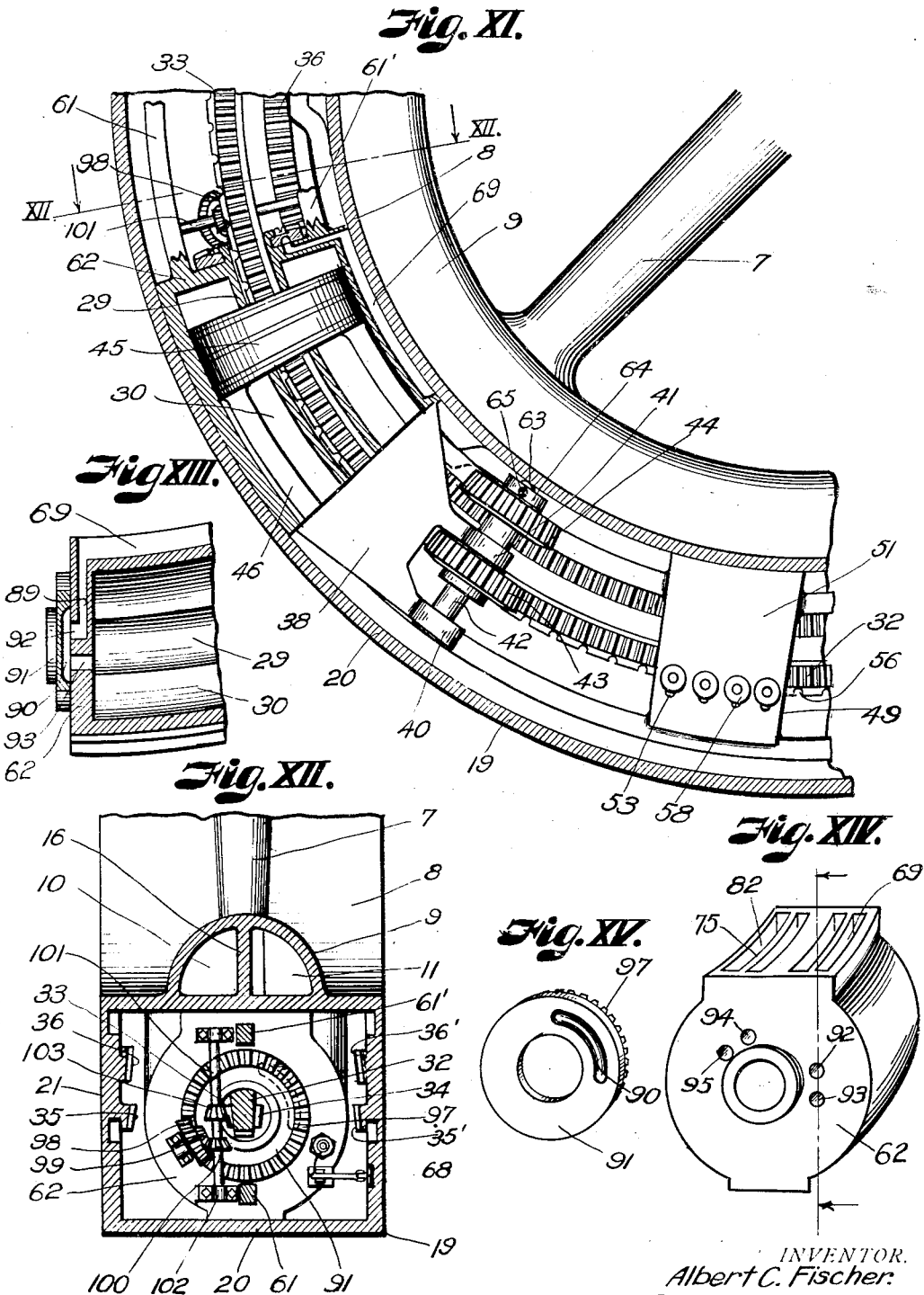

UNITED STATES PATENT OFFICE.

ALBERT C. FISCHER, OF KANSAS CITY, MISSOURI.

POWER-CONTAINED DRIVE-WHEEL.

1,370,298.            Specification of Letters Patent.            Patented Mar. 1, 1921.

Application filed February 23, 1917. Serial No. 150,498.

*To all whom it may concern:*

Be it known that I, ALBERT C. FISCHER, a citizen of the United States, residing at Kansas City, in the county of Jackson and State of Missouri, have invented certain new and useful Improvements in Power-Contained Drive-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a power contained drive wheel, and more particularly to a rotatable wheel wherein power is generated for inducing revoluble travel of the wheel; the principal object of the invention being to secure direct application of the motive force and thereby increase the efficiency of the prime movers.

In the principal embodiment of the invention I have shown a wheel containing elements of the ordinary explosion engine, and will limit the following description thereto, with the understanding, however, that the scope of the invention is not limited to this particular motive force.

In utilizing the power from explosion engines in connection with the wheel, I locate two or more cylinders within the wheel and connect the cylinder of one engine with the piston of another, whereby explosion of a charge in one cylinder will tend to drive its piston forwardly, and reaction of the cylinder upon the explosion of the charge drives the cylinder itself oppositely to the piston, and through the connection of the rearwardly moving cylinder with the piston of an adjacent cylinder tends to force said piston in a direction to effect compression of an intaken charge in the cylinder of the moved piston. Power from a moving piston is applied through a floating member to the wheel and movement of the wheel is used to impart motion to any suitably driven member.

The assembly of the device comprises clutches for connecting the pistons and cylinders with the floating member during the power stroke and for disconnecting the same during the compression stroke, and other details which will be presently more fully described.

In the present form of device I utilize a two-cycle engine principle in that the charge is taken into one part of the cylinder during a compression stroke and transferred to the expansion chamber during the power stroke; this arrangement necessitating suitable supply and exhaust elements which will also be presently described.

In accomplishing the above objects I have provided other details of structure; the preferred forms of which are illustrated in the accompanying drawings, wherein:—

Figure I is a central, longitudinal section of a wheel constructed in accordance with my invention.

Fig. II is a central, transverse section of the same.

Fig. III is a central, longitudinal section of the wheel, with the cylinders and other movable parts removed to better illustrate the fixed racks and cam groove forming parts of the wheel.

Fig. IV is an enlarged detail perspective view of the intake and exhaust manifolds formed integrally with the wheel rim.

Fig. V is an enlarged detail perspective view of the clutch for connecting a piston rod with the floating ring.

Fig. VI is a cross-section of the rim housing and its contained parts, on the line VI—VI, Fig. I.

Fig. VII is a similar view on the line VII—VII, Fig. I; the floating ring being removed.

Fig. VIII is an enlarged detail perspective view of one of the cylinders, with a part of its contained housing, and particularly illustrating the gear connection between the housing and floating ring, and the intake and exhaust ports of the cylinder.

Fig. IX is an enlarged detail section of one of the automatic intake or exhaust valves.

Fig. X is a central longitudinal section of a multi-cylinder wheel.

Fig. XI is a longitudinal section of a portion of the multi-cylinder wheel.

Fig. XII is a cross section on the line XII—XII, Fig. XI.

Fig. XIII is a longitudinal section of a portion of one of the cylinders, particularly illustrating the intake and exhaust valves, and the intake ports leading to the cylinder.

Fig. XIV is a detail perspective view of one of the cylinders, particularly illustrating the intake and exhaust ports.

Fig. XV is a detail perspective view of the intake and exhaust valve.

Fig. XVI is a longitudinal section of a modified form of cylinder, having a plurality of combustion chambers.

Referring more in detail to the drawings:

1 designates the wheel as a body, comprising a hub 2, whereby the wheel is mounted on a shaft or axle 3; the present construction contemplating the mounting of the wheel on a rotatable axle having an intake channel 4 through which a fluid fuel may be delivered to the cylinders, and a similar channel 5 through which the cylinders may exhaust in the manner hereinafter described.

The wheel 1 also comprises spokes 7 carrying an integral rim 8, having formed on its inner surface a boss 9 containing the annular manifold chambers 10 and 11; the former communicating through a channel 12 in the spoke 13 with the fuel supply channel 4 of the axle 3, and the chamber 11 communicating through a channel 14 in the spoke 15 with the exhaust channel 5 of said axle.

The intake and exhaust manifold chambers 10 and 11 are separated by a diaphragm 16, also formed integrally with the rim and forming a complete separation between the individual manifold chambers.

The rim 8 is of substantial breadth and has a flange 18 at one edge forming a stop for a housing 19 that is adapted to fit snugly over the rim and comprises the periphery 20, over which a belt may be run if desired, and the side walls 21—22; the wall 21 having a shoulder 23 at its inner edge seating against the rim flange 18, and the wall 22 having a shoulder 24 in which a keeper ring 25 is adapted to seat to lock the housing to the wheel rim. The housing and wheel body travel together, being preferably connected when the housing is in place by cap screws 24'.

Located within the housing 19, but having no fixed connection therewith, are cylinders 26—27, here shown to be two in number, and located diametrically opposite in the wheel, each cylinder being segmental in shape and concentric with the wheel, as shown. Extending through each of the cylinders is a central channel 29, thereby forming an annular chamber 30 within which a piston, hereinafter described, is adapted to work.

Extending continuously within the housing and through the central cylinder channels is a floating ring 32, having continuous racks 33—34 on its side faces, the ring being slightly wedge-shape in cross-section in order that the side racks may form bevel gear members tapering from a larger diameter at their inner ends to a smaller diameter at their outer ends.

Formed integrally with each side wall of the housing 19 are spaced racks 35—36, 35'—36', as shown, for the purposes hereinafter described and spaced on the side walls; the teeth of the inner racks 36 being longer than those of the outer racks 35 in order that the pinions which are adapted to mesh respectively therewith may be shifted to free the pinion from one pair of racks while leaving other connected pinions in mesh with the other pair of racks.

Each of the cylinders 26 has formed integrally therewith a pair of spaced arms 38 at its piston end; the said arms having yokes 39 at their free ends equipped with bearing collars 40—41.

Mounted in the collars on each arm 38 is a pin 42, and rotatably and slidably mounted on said pin are the connected pinions 43 and 44; the pinions 43 meshing at one side with the rack teeth 34 of the floating ring 32, and at the opposite side with the rack 35 or 35', as the case may be.

With this arrangement it is apparent that the opposite pinions 43 form a chain of gears from one side of the housing to the other through the floating ring, so that when the ring is driven in one direction it operates both of the pinions 43 in opposite directions, and these pinions meshing with the racks 35—35' on the housing tend to drive the housing in a direction opposite to the movement of the floating ring.

It is necessary at times to disconnect the pinions 43 and the cylinders upon which they are mounted from the floating ring for the purposes hereinafter disclosed, but in order to maintain the proper relation between the pinions and the housing racks, in order that the parts may properly mesh at all times, the supplemental pinions 44 are provided and adapted for transverse movement in the housing racks 36, so that when the pinions are shifted to disconnect the pinions 43 from the floating ring racks, the supplemental pinions merely shift along their housing racks without losing their connection therewith, so that there is coöperation at all times between the pinions and housing racks, and a constant connection of the cylinders with the housing.

Located in each of the cylinders is a piston 45 constructed as a ring to work in the annular cylinder chamber 36; the said piston comprising a bifurcated rod 46 that extends through ports 47 in the outer cylinder head 48, and carries a clutch 49 (Fig. V); the outer member 46' of the rod seating in a groove 50 in the outer wall of the clutch, but being rigidly secured thereto, so that the clutch works with the piston rod.

As it is the purpose of the invention to so connect the pistons and cylinders, that upon the power stroke of one piston, another cylinder will be returned by said connection to effect exhaust and compression, it is essential that the pistons operate alternately, and it is further essential that as the floating ring is operatively connected with each piston during its power stroke it must be disconnected upon return movement of the piston. I, therefore, effect the connection between the pistons and the floating ring through a clutch mechanism, preferably of the type herein shown. This clutch comprises the block 51 which bears at its inner side against the inner wall of the housing, and is provided with an arcuate channel 52 through which the floating ring is extended.

In opposite walls of the channel 52 are paired radial slots 53 of any suitable number, and slidably mounted in said slots are cross rods 54, suitably connected by links 55 and adapted for seating within the channel in cross grooves 56 in the outer periphery of the floating ring 33 to form a lock connection between the ring and clutch.

To move the clutch rods into and out of the cross grooves of the floating ring to effect connection and disconnection thereof with the piston rod, I provide the ends of the rods with rollers 58 which are adapted for travel in cam grooves 59 in the inner faces of the housing walls; the cam grooves being of sufficient width to contain the rollers without lost motion.

At determined intervals about the housing I extend the grooves 59 outwardly, as at 60, (Fig. III), so that while the rollers are traveling within the body portions of the grooves the rods are held to their seats in the floating ring, but when they reach the outstanding portions 60 the rollers are carried outwardly into said portions, and the rods lifted away from the ring to free the same from the piston. It is during this interval of disconnection that the other piston is moved through its power stroke and the first piston returned to exhaust burned gases, take in and compress a fresh charge.

The return of each piston is accomplished by the back-thrust of the other cylinder; it being apparent that expansion of an ignited charge in the cylinder is equal in both directions, with the result that while the expansion of the charge drives a piston forwardly to advance the floating ring through the clutch mechanism described, and moves the housing 19 in the opposite direction through the gear wheels that mesh with the floating ring and the housing racks, there is an equal reaction of the cylinder in the opposite direction. This reaction induces a thrust through the connecting rods 61—61' that rigidly connect a cylinder head 62 with the clutch 49 which lies at the rear of the cylinder, and is connected through piston rods 46 with the piston 45 that works in said other cylinder; this back-thrust of the cylinder forcing the other piston backwardly to compress a charge previously admitted to its cylinder upon the last power stroke of its piston. It is to disconnect the pinions 43 from the floating ring during this back travel of the cylinders that the pinions have the automatic shift movement provided by the sliding mounting on their pins 42 in the sleeves 40—41 on the cylinder arms 38.

The shifting movement is accomplished by fixing collars 64 on extensions 63 of the pinion body and providing the collars with crank arms 65 having rollers 66 that travel in the housing grooves 59, so that at the moment the clutch rollers 58 enter one outset portion of the cam groove, the rollers 66 enter another outset portion and the pinions are shifted to release the floating ring from the pinions during the same period that the ring is released from the clutch. This release leaves one cylinder and the opposite piston free to move backwardly to effect the compression in the idle cylinder. Because of the extension of the rack, however, the shifting of the pinions 44 does not release these pinions from the housing rack so that the housing retains its connection with the cylinder during the back thrust; the cylinder during this period moving in the same direction as the housing.

The cam groove, being located in the housing, the ignition is timed relative to the operation of the clutch and locking pinions by connecting a spark plug 67 on the cylinder with a brush, or the like, 67', carried by the cylinder and adapted for wiping a brush 68 on the housing; the housing brush having connection through a suitable conductor 68', run to and extended along the axle 3, with a source of electrical supply, not shown. The charges of fuel mixture are admitted to the cylinders from the intake manifolds through elongated ports 69 in the inner walls of each cylinder; said ports being adapted to pass over check valves 70, having communication with the intake manifold and normally closed by balls, or the like, 71, that are urged to their seats 72 by springs 73 and project into the path of the cylinders within the housing, so that as the wheel rim 3 moves along the cylinders the balls 71 are depressed to open the valve port and admit the fuel mixture to the cylinder through the elongated cylinder ports 69.

In order to retain the valve 71 depressed against the tension of its spring I provide a central diaphragm 75 in each of the cylinder ports that continues a bearing on the ball valve to retain the latter depressed and retain communication between the manifold and cylinder during the entire period in which the cylinder is moving over the ball valve.

The valve 70 comprises the housing 75ᵃ forming the inclosure for the spring and ball, and having ports 76 for admitting the fuel mixture to its interior. The ball 71 is preferably seated in a cup 77 and the spring 73 seated on the bottom of the housing and bearing against the cup to retain the ball yieldingly in closed position.

The elongated cylinder port 69 has a restricted opening 79 to the interior of the cylinder outwardly from a central point thereof, so that as the piston moves back in the cylinder it uncovers the port, and during a brief period effects suction in the cylinder, whereby the fuel charge is drawn to the cylinder chamber. When the piston advances on its power stroke, the burned gases which have been caused to flow toward a restricted exhaust outlet 81 in the opposite wall of the cylinder opposite the intake opening, are forced out into an elongated port 82 which communicates with the exhaust manifold 11, thereby cleaning the engine of the burned gases. Continued movement of the piston on its power stroke forces the fuel mixture through an opening 83 adjacent the outer end of the cylinder into a channel 84 that communicates with the inner end of the cylinder so that before the piston reaches the limit of its stroke the mixture has been delivered to the explosion chamber 30 back of the piston, and is compressed therein upon return movement of the piston under the influence of the opposite reacting cylinder.

The device may contain detail elements for facilitating its operation, such as roller bearings 86 for the clutches 49 and baffles 87 for retarding the exhaust in the manifold 11, although such details are of common construction and need not be specifically mentioned nor described herein.

In using the wheel, assuming the parts to be constructed and assembled as described, when a wheel is in operation, a charge is drawn into one of the cylinders and ignited, thereby advancing the piston for its power stroke and effecting a reactive stroke on the cylinder. The power stroke of the piston advances its clutch 49 through the bifurcated rod 46, and the clutch being in connection with the floating ring advances the ring in the direction of movement of the piston. Forward movement of the ring rotates the paired pinions 43 that are in mesh with the ring racks, and rotation of the pinions 43 moves the wheel in a direction opposite to travel of the ring. This driving thrust is effected during the forward movement of the piston, and as the piston reaches the limit of its stroke the rollers 58 on the clutch rods and the rollers 66 on the pinion rods enter respective cam portions 60 of the housing grooves 59 and shift the clutch and pinion simultaneously to disconnect the piston rod and the pinions from said ring. At the moment one piston is disconnected from the ring, as described, expansion takes place in the other cylinder and reactive force of said cylinder moves the inactive piston back in its cylinder through the thrust of the reaching cylinder on the connecting rods 61, the clutch 49, the piston rods 46 to the piston 45.

During the power movement of the first piston, a charge previously admitted to this cylinder in advance of the piston has been forced through the connecting channel 84 to the expansion chamber, so that upon back movement of the piston the charge is compressed and, at the proper moment, ignited to produce a repetition of the driving movement just described; the cleaning of the cylinder, the igniting of the charge, and the operation of the intake and exhaust valves 70 taking place as described.

During the operation, each cylinder and its piston will have a back and forward movement relative to each other, while remaining substantially stationary relatively to revoluble travel of the wheel, and the floating ring and the wheel will have continuous revoluble movement in opposite directions. The ring has intermittent locking relation with the pistons while the housing is free from such anchorage, and is adaptable for supplying power to a driven member through a belt 88, or other medium.

The modified form shown in Figs. X to XV inclusive, is one wherein the construction embodies more than two prime movers within the housing, and requires valves for controlling intake and exhaust directly to or from the cylinders. The principal elements of the device are identical with the form heretofore described; the only difference being that the elongated intake and exhaust ports of each cylinder have channels 89 opening through the end of the cylinder to a passage 90 in a valve cap 91 that is revolubly mounted on the cylinder head, so that at proper periods the channel 90 is turned to overlie the port 92 of the channel 89 and a channel 93 leading to the interior of the cylinder; the same valve serving both the intake and exhaust, as the intake port 92 and channel 93 for the intake are located concentrically with the port 94 and channel 95 of the cylinder exhaust, although the intake and exhaust ports are spaced to effect the intake and exhaust at proper periods.

The valve cap 91 may be provided with an annular rack 97 whereby the cap is revolved through connection of the rack with a beveled gear wheel 98 integral with a pinion 99 on a shaft arranged radially with the valve cap; the pinion 99 meshing with a pinion 100 on a shaft 101 journaled in bearings 102 on the cylinder head.

Also fixed on the shaft 101 is a pinion 103 meshing with the rack on one face of the floating ring 30, whereby the valve cap of each cylinder is actuated from the floating ring.

The operation of the modified type of construction is similar to that just described except for the operation of the valves which provides an operation of the engine substantially similar to the ordinary explosion engine.

In the modified form of cylinder illustrated in Fig. XVI, the piston 45, in the preferred form of cylinder, is supplanted by a cylinder 103' and the central channel 29 has a piston 104 rigidly attached thereto, adapted for oscillation in the said cylinder, and separating the cylinder into combustion chambers 105—106; the cylinder 103' being slidable in the cylinder 67.

The mechanism for controlling the admission and exhaust of the gases to and from the combustion chambers 30—105 and 106 is the same as that heretofore described and shown in Fig. XIII, wherein the valve cap 91, revolubly mounted on the head of the cylinder, connects the elongated parts 69 and 82 to the separate channels leading to the combustion chambers.

Assuming that a charge has been admitted to the chamber 30, an explosion takes place which compresses a charge that has been admitted to the chamber 105 and exhausts the burnt gases from the chamber 106, the succeeding cycles taking place in the usual manner.

Having thus described my invention what I claim as new therein and desire to secure by Letters-Patent, is:

1. In combination with a revoluble member, a prime mover contained within the said member having no permanent fixed relation therewith and operable to transmit revoluble motion thereto.

2. In combination with a revoluble member, a plurality of expansible prime movers contained entirely within the said member with no permanently fixed relation therewith and operable to transmit revoluble motion to the revoluble member.

3. In combination with a revoluble member, a plurality of expansible prime movers mounted within the revoluble member but having no permanent fixed relation thereto; each of the prime movers having a driving element operatively connected with the revoluble member and a body operatively connected with the driving element of another mover.

4. In combination with a revoluble member a plurality of expansible prime movers carried by said member, but having no permanent fixed relation thereto, each having a driving element adapted for operative connection with the revoluble member and a body operatively connected with the driving element of another mover.

5. A drive wheel comprising an annular peripheral housing and a prime mover located within said housing and operable to rotate the same.

6. A drive wheel having a peripheral housing, a plurality of expansible prime movers mounted within the housing, each having a driving element in clutch relation to the housing and a body operatively connected with the driving element of another mover.

7. In combination with a revolubly supported drive wheel having an annular peripheral housing, an independently revoluble ring and a plurality of expansible prime movers mounted within the housing, each of said movers comprising relatively movable body and driving elements, connection between each driving element and with the said ring, and means carried by each movable body and operable by said ring member for transmitting revoluble motion to the wheel.

8. In combination with a drive wheel having an annular peripheral housing, an independently revoluble ring and a plurality of expansible prime movers located within the housing; each of said movers comprising relatively movable body and driving elements, a clutch connection between each driving element and said ring operable to move the ring in one direction, means carried by each movable body and operable by movement of said ring to transmit revoluble motion to the wheel.

9. In combination with a drive wheel having an annular peripheral housing, an independently revoluble ring and a plurality of expansible prime movers located within the housing; each of said movers comprising relatively movable body and driving elements, connection between the body of one mover and the driving element of another mover including a clutch for engaging the ring and transmission mechanism in normal engagement with the ring and wheel housing whereby movement of the ring under influence of the driving element transmits revoluble motion to the wheel.

10. In combination with a drive wheel having an annular peripheral housing, an independently revoluble ring and a plurality of expansible prime movers located within the housing; each of said movers comprising relatively movable body and driving elements, connection between the body of one mover and the driving element of another mover including a clutch for engaging the ring and transmission mechanism in normal engagement with the ring and wheel housing whereby movement of the ring under influence of the driving element transmits revoluble motion to the wheel, and means for disconnecting said clutch from its engaging revoluble member.

11. In combination with a drive wheel having an annular peripheral housing an independently revoluble ring and a plurality of expansible prime movers located within the housing; each of said movers comprising relatively movable body and driving elements, connection between the body of one mover and the driving element of another mover including a clutch for engaging the ring member to move the latter in one direction, transmission mechanism carried by said body in normal engagement with the ring and housing, and means for intermittently shifting the clutch and transmission mechanism to free the ring member.

12. In combination with independently revoluble members, one provided with a cam track, a plurality of prime movers, each comprising a body and a driving element, connection between the body of each mover and the driving element of another mover, a clutch in said connection for engaging one of the revoluble members and operable by the cam track of the other member to break such engagement, and mechanism carried by each mover body for transmitting movement from one revoluble member to the other.

13. In combination with independently revoluble members, one provided with a cam track, a plurality of prime movers, each comprising a body and a driving element, connection between the body of each mover and the driving element of another mover, a clutch in said connection for engaging one of the revoluble members and operable by the cam track of the other member to break such engagement, mechanism carried by each mover body for transmitting movement from one revoluble member to the other, and means operable by said cam track to shift the transmission and disconnect said members.

14. In combination with a revoluble housing having facing racks on its opposite side walls, a ring located within the housing having rack teeth on its side faces, a plurality of prime movers, each comprising a driving element and a body, means connecting the driving element and said ring, paired pinions rotatably carried by each mover body in mesh with the opposite ring racks, and a second pair of pinions operable with the first named and meshing with the opposite housing racks, whereby the housing is rotated from said ring.

15. In combination with a revoluble housing having facing racks on its opposite side walls, a ring located within the housing having rack teeth on its side faces, a plurality of prime movers, each comprising a driving element and a body, means connecting the driving element and said ring, paired pinions rotatably carried by each mover body in mesh with the opposite ring racks, a second pair of pinions operable with the first named and meshing with the opposite housing racks, whereby the housing is rotated from said ring, and means for shifting said pinions to disconnect the first pair from the ring racks.

16. In combination with a revoluble housing having facing racks on its opposite side walls, a ring located within the housing having rack teeth on its side faces, a plurality of prime movers, each comprising a driving element and a body, means connecting the driving element and said ring, paired pinions rotatably carried by each mover body in mesh with the opposite ring racks, a second pair of pinions operable with the first named and meshing with the opposite housing racks, whereby the housing is rotated from said ring, and means for shifting said pinions to disconnect the first pair from the ring racks while retaining the second pair in mesh with the housing racks.

17. In combination with a revoluble housing having facing racks on its opposite side walls, a ring located within the housing having rack teeth on its side faces, a plurality of prime movers, each comprising a driving element and a body, means connecting the driving element and said ring, paired pinions rotatably carried by each mover body in mesh with the opposite ring racks, a second pair of pinions operable with the first named and meshing with the opposite housing racks, whereby the housing is rotated from said ring, means for shifting said pinions to disconnect the first pair from the ring racks while retaining the second pair in mesh with the housing racks, and means for disconnecting the driving elements from said ring.

18. In combination with a revoluble housing having side walls provided with cam grooves and spaced racks, a rotatable ring within the housing having rack teeth on its side faces and sockets in its periphery, a plurality of prime movers located within the housing, each comprising a body and a driving element, the body of each mover being connected with the driving element of another mover, a clutch in each said connection comprising radially movable rods adapted for seating in the ring sockets and having members located in said cam grooves to move the rods into and from the ring sockets, a rotatable and longitudinally movable rod carried by each mover body, paired pinions fixed to said rod and adapted for meshing with the ring teeth, other paired pinions fixed on said rod meshing with the housing racks, whereby the housing is driven from said ring, and a member on said rod adapted for travel in said cam groove whereby the rod is shifted to move the pair of said pinions from and into mesh with said ring teeth.

19. In combination with a rotatable housing, of a plurality of engine cylinders located in said housing and having central channels extending therethrough, a rack ring rotatable within the housing and within said cylinder channels, pistons in said cylinders, connection between each cylinder and a piston of another cylinder, a clutch in each said connection for engaging said ring, and means carried by each cylinder for transmitting power from the ring to said housing.

20. In combination with a drive wheel having an annular peripheral housing, an independently revoluble ring and a plurality of freely movable engine cylinders located within the housing, a piston for each cylinder, connection between each cylinder and the piston of another cylinder whereby reaction of a cylinder may effect a compression stroke of the piston in another cylinder, a clutch in each said connection for engaging the ring member to actuate the same in one direction, and means operable from said ring for transmitting revoluble motion to the wheel.

21. In combination with a drive wheel having an annular peripheral housing, an independently revoluble ring and a plurality of freely movable engine cylinders located within the housing, a piston for each cylinder, connection between each cylinder and the piston of another cylinder whereby reaction of a cylinder may effect compression of stroke of the piston in another cylinder, a clutch in each said connection for engaging the ring member, means operable from said ring member for operating the wheel, and means for simultaneously disconnecting said clutch and said operating means from the wheel and ring to permit independent movement of the two same.

22. In combination with a housing mounting comprising intake and exhaust manifolds, a housing rotatable on said mounting, valves controlling communication between the manifolds and the housing and comprising yielding means operable from within the housing, a plurality of engine cylinders freely located within the housing and comprising elongated ports having release therein for engaging the yielding valve members to open communication between the manifolds and the interior of the cylinders, pistons in said cylinders, means for igniting charges in the cylinders with the piston of another cylinder, a freely revoluble member within the housing, a clutch in each said connection for engaging said interior revoluble member, and means for transmitting power from said interior member to the housing, and means for disconnecting said interior member from the housing at determined intervals relative to operation of said pistons.

In testimony whereof I affix my signature.

ALBERT C. FISCHER.